United States Patent
Pipes

[11] Patent Number: 4,496,274
[45] Date of Patent: Jan. 29, 1985

[54] MATERIAL HANDLING VEHICLE

[75] Inventor: George R. Pipes, Salt Lake City, Utah

[73] Assignee: Eaton Corporation, Cleveland, Ohio

[21] Appl. No.: 406,258

[22] Filed: Aug. 11, 1982

[51] Int. Cl.³ .................... B65G 67/00; B60P 1/02; B62D 25/00

[52] U.S. Cl. .................... 414/340; 280/104; 180/68.5; 104/34

[58] Field of Search ............ 414/471, 495, 589, 340, 414/345; 104/34; 280/104; 180/68.5

[56] References Cited

U.S. PATENT DOCUMENTS

| | | | |
|---|---|---|---|
| 3,266,815 | 8/1966 | Bishop | 280/104 |
| 3,366,398 | 1/1968 | Mulholland | 280/104 X |
| 3,504,928 | 4/1970 | Reimer | 280/104 |
| 3,599,744 | 8/1971 | Satterfield et al. | 180/279 |
| 3,612,312 | 10/1971 | Behrmann | 414/495 X |
| 3,620,565 | 11/1971 | Eggert, Jr. et al. | 414/495 X |
| 3,768,586 | 10/1973 | Thompson et al. | 180/168 |
| 3,912,037 | 10/1975 | Krieg | 180/168 |
| 3,917,306 | 11/1975 | Madler et al. | 280/104 |
| 4,120,411 | 10/1978 | Johnson | 104/34 X |
| 4,137,984 | 2/1979 | Jennings et al. | 180/168 X |
| 4,216,839 | 8/1980 | Gould et al. | 180/68.5 X |

FOREIGN PATENT DOCUMENTS 569769 1/1959 Belgium .............. 180/68.5

Primary Examiner—Joseph E. Valenza
Assistant Examiner—David A. Bucci
Attorney, Agent, or Firm—C. H. Grace; F. M. Sajovec

[57] ABSTRACT

A wire-guided vehicle (10) in which a load is carried by a load platform (18) which is suspended from a base frame (12) by link members (42). The load is carried on a load carriage (20) which is moved vertically relative to the load platform by a plurality of screw jacks (92) acting between the load platform and the load carriage. The base frame is articulated about a transverse axis (27), and a power unit (14) which includes drive-steer units (16) is mounted on the base frame for pivotal movement about a longitudinal axis (34). A battery carrier (116) of the vehicle includes a latch assembly (152) which retains the power supply batteries within the vehicle while permitting easy removal when the latch assembly is engaged by a battery cart (170).

13 Claims, 10 Drawing Figures

Fig. 8
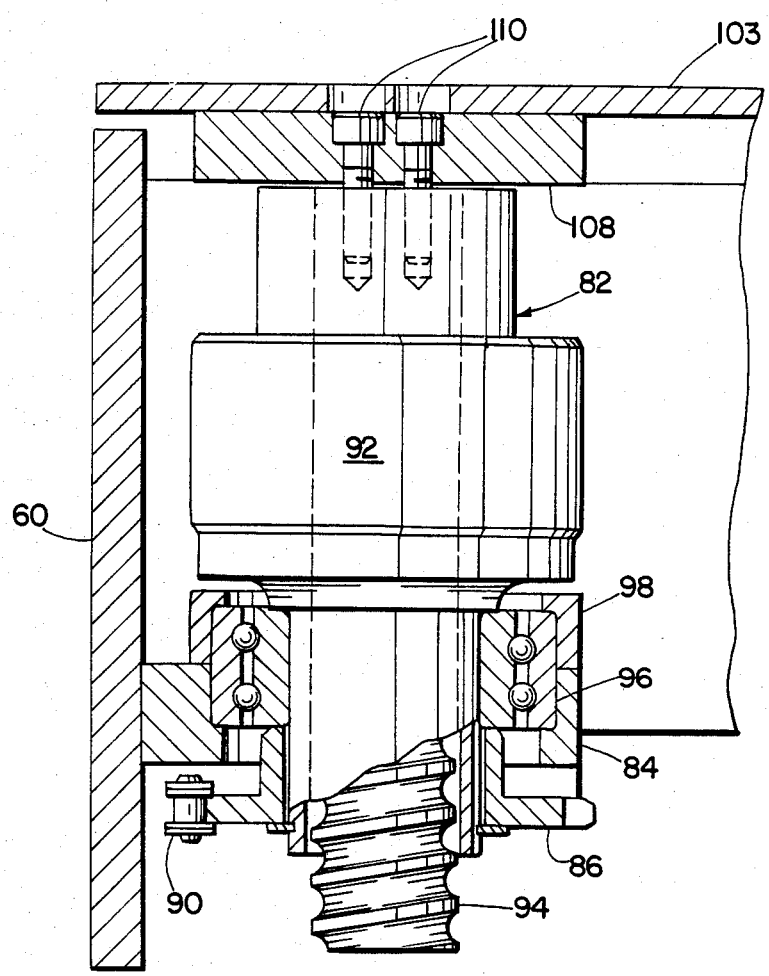
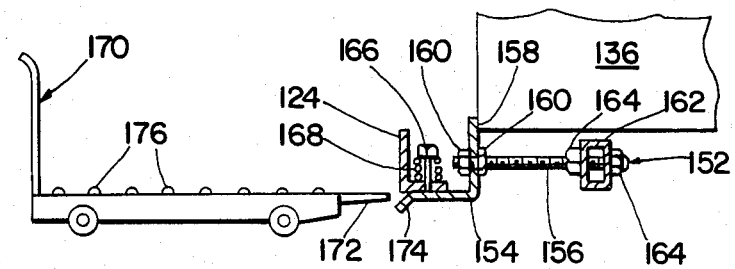
Fig. 10

4,496,274

MATERIAL HANDLING VEHICLE

The present invention relates generally to material handling vehicles, and more particularly to a vehicle which is particularly adapted for use in a wire-guided vehicle system.

Wire-guided material handling vehicle systems are well known. Heretofore, however, the primary emphasis in the design of such systems has been on the control systems therefor, as illustrated by U.S. Pat. No. 3,768,586 to Thompson et al.

With regard to the vehicle used in such systems, development work has generally been directed to steering systems such as that shown in U.S. Pat. No. 3,912,037 to Krieg, and to safety bumpers such as that shown in U.S. Pat. No. 3,599,744; however, very little development effort has been made on the basic load carrying and drive aspects of such vehicles, particularly where the vehicle must include a load platform which is movable relative to the vehicle frame to transfer a load between the vehicle and a fixed load station.

What the present invention intends to provide is an improved vehicle which is particularly adapted for use as a driverless, wire-guided vehicle. More particularly, it is an object of the invention to provide a vehicle of relatively low weight in relation to its load carrying capability, improved load transfer capability, improved traction and steerability, and a vehicle with improved means for isolating the load from shocks due to floor irregularities and due to sudden maneuvers such as a safety-related sudden stop.

To meet the above objectives, the present invention provides a vehicle which comprises a base frame, a load platform suspended from the frame, and a load carriage mounted for up and down movement relative to the load platform. The vehicle includes a pair of centrally disposed drive units and four caster wheels, one at each corner of the vehicle frame. The base frame is articulated about an axis transverse to the direction of travel of the vehicle, and the sub-frame carrying the drive units pivots about an axis parallel to the direction of travel. The load carriage is mounted to the load platform on four screw jacks, which are driven by a central gear motor to provide up and down travel of the load carriage for transferring loads between the vehicle and a load station. Load isolation is provided by suspending the load platform from the base frame by means of ball links.

Other objectives and advantages of the invention will be apparent from the following description when taken in connection with the accompanying drawings, wherein:

FIG. 8 is a fragmentary view, shown partly in section, of a lift jack of the vehicle;

FIG. 10 is a fragmentary section view taken along line 10—10 of FIG. 9.

Figure 1:
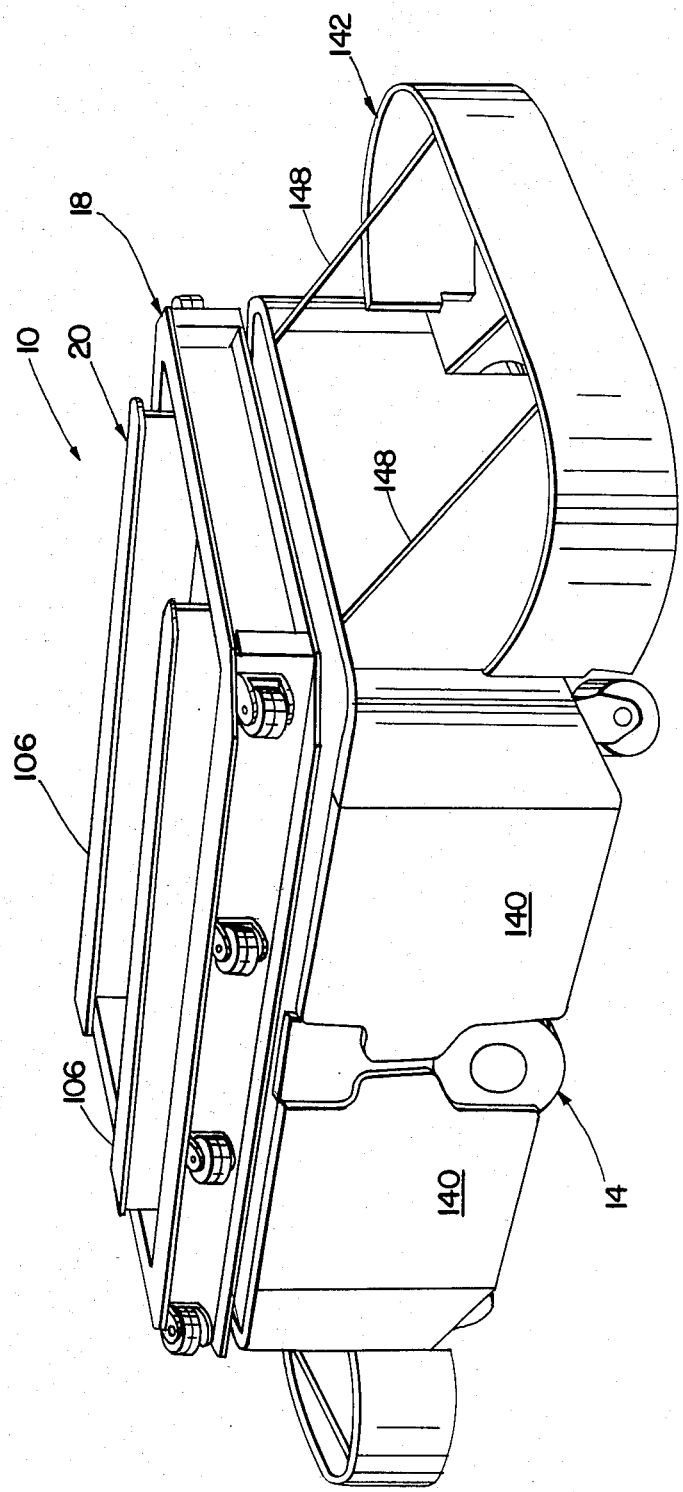
FIG. 1 is a perspective view of the vehicle of the invention.

Referring to FIG. 1, there is illustrated a material handling vehicle 10 of the type which is automatically controlled by means of signals received from wires (not shown) which are buried in a floor to define a guide path for the vehicle. The general function of such vehicles and the controls therefor are well known and will not be discussed herein in detail. The vehicle illustrated herein is completely bi-directional in operation; however, for purposes of description it will be understood that any reference to a forward direction in the following description will refer to movement to the left, as shown in FIG. 3.

The vehicle 10 comprises a base frame 12, a power unit 14 comprising a pair of electric motor wheel units 16 oppositely disposed about the longitudinal centerline of the vehicle and centrally disposed fore and aft of the vehicle, a load platform 18 suspended from the base frame, and a load carriage 20 which is mounted for vertical movement relative to the load platform.

Figure 3:
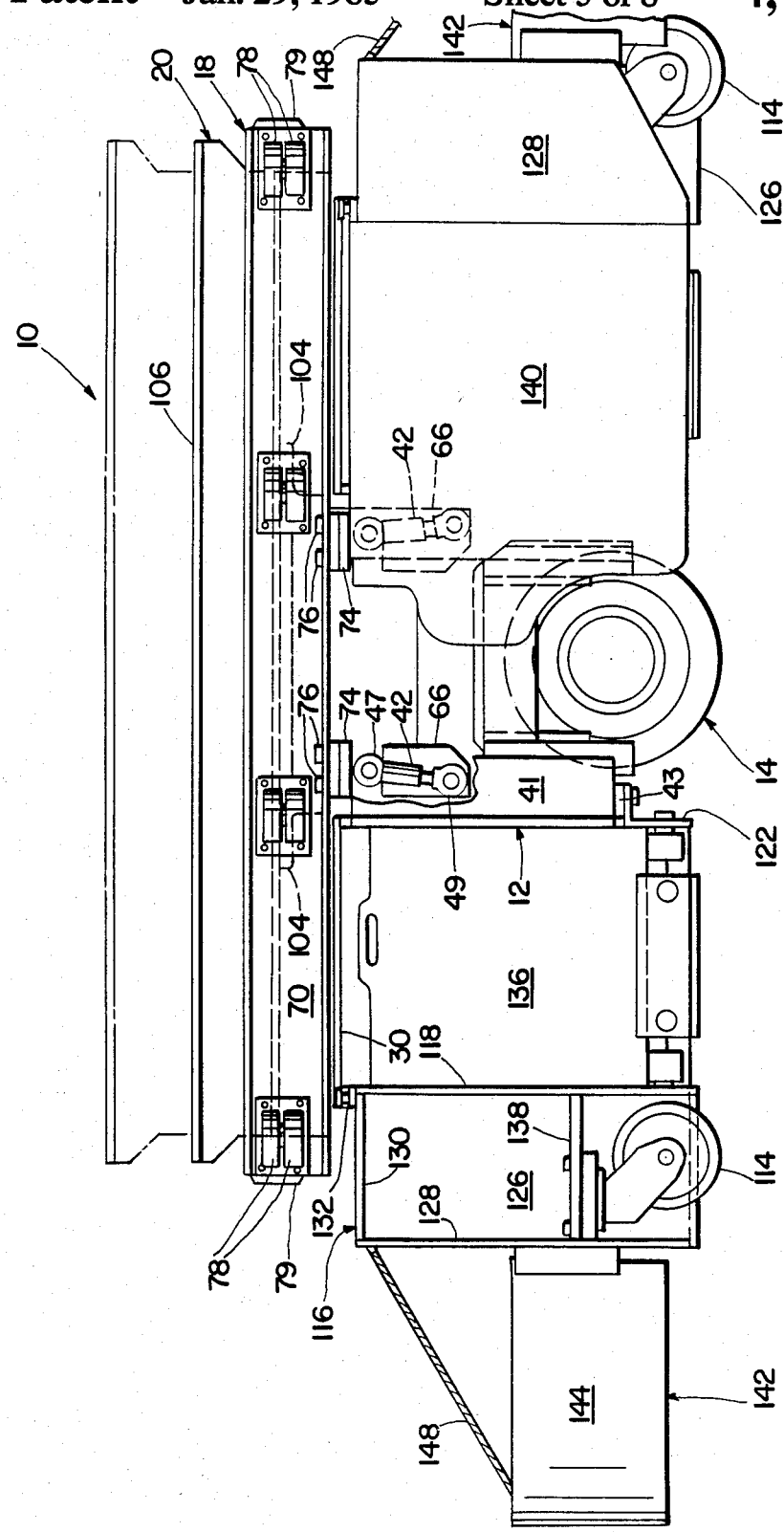
FIG. 3 is a side elevation view of the vehicle with parts removed to show internal details.
Figure 5:
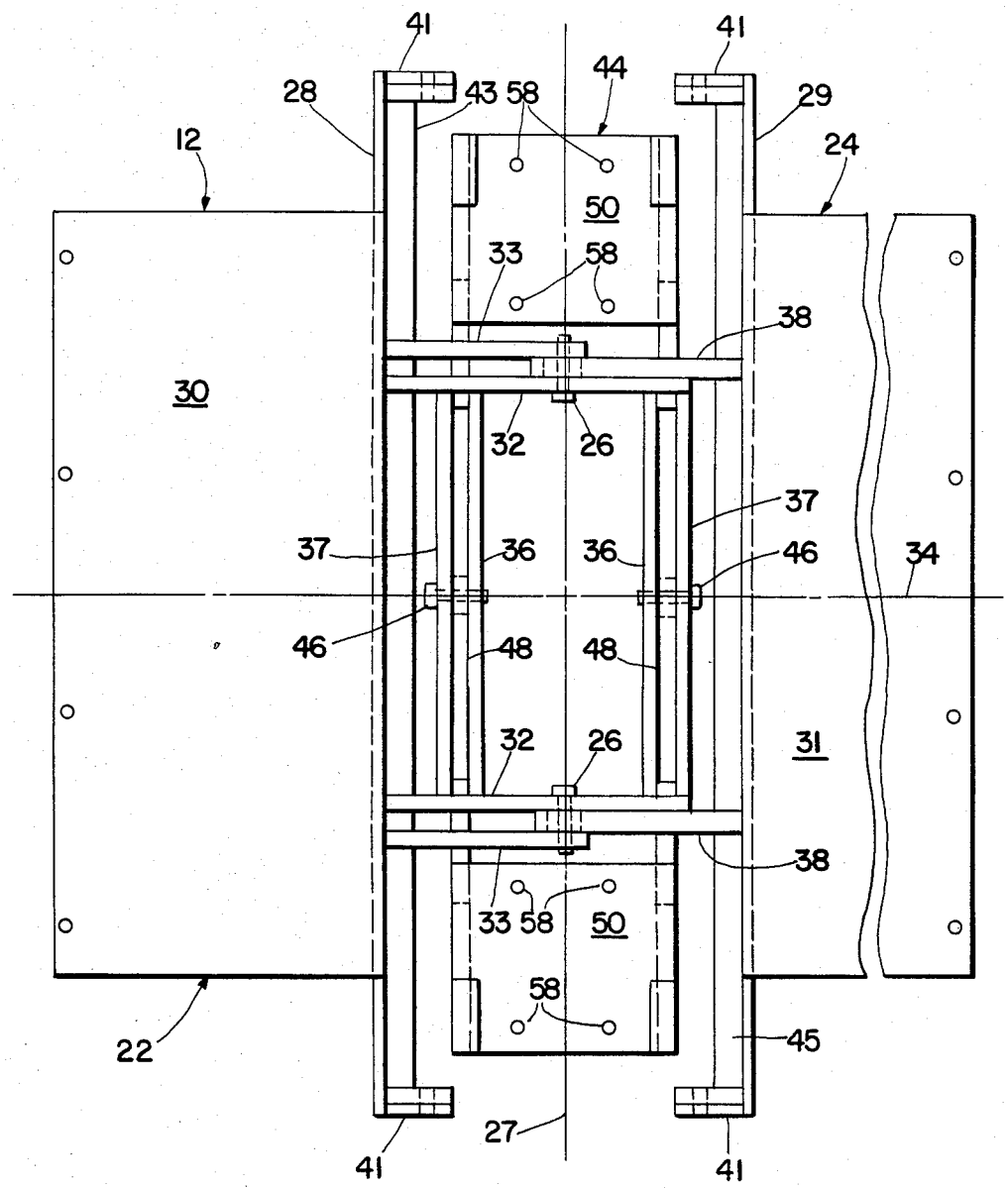
FIG. 5 is a plan view of the base frame of the vehicle.

Referring particularly to FIGS. 3 and 5, the base frame 12 is an articulated assembly comprising a first frame unit 22 and a second frame unit 24 which pivot relative to one another about pivot pins 26 aligned on the transverse centerline 27 of the vehicle.

The first frame unit 22 comprises a first vertical plate member 28 extending transversely of the vehicle, a horizontal top plate 30, a transverse stringer 43 welded to the bottom of plate member 28, a first pair of vertical pivot plates 32 and 33 which extend from the vertical plate member toward the transverse centerline 27, and a second identical pair of pivot plates 32 and 33, the two sets of pivot plates being transversely offset from the longitudinal centerline 34 of the vehicle and symmetrical thereabout. Each of the plates 32 and 33 are spaced from each other to receive a corresponding pivot plate mounted on the second frame unit, as will be described later. The inner pivot plates 32 are somewhat longer than the outer plates 33, and pairs of transverse pivot plates 36 and 37 are received between them and welded thereto. The individual transverse plates 36 and 37 are spaced apart from each other a distance suitable to receive a corresponding plate which is part of the power unit 14, as will be described in further detail.

Figure 4:
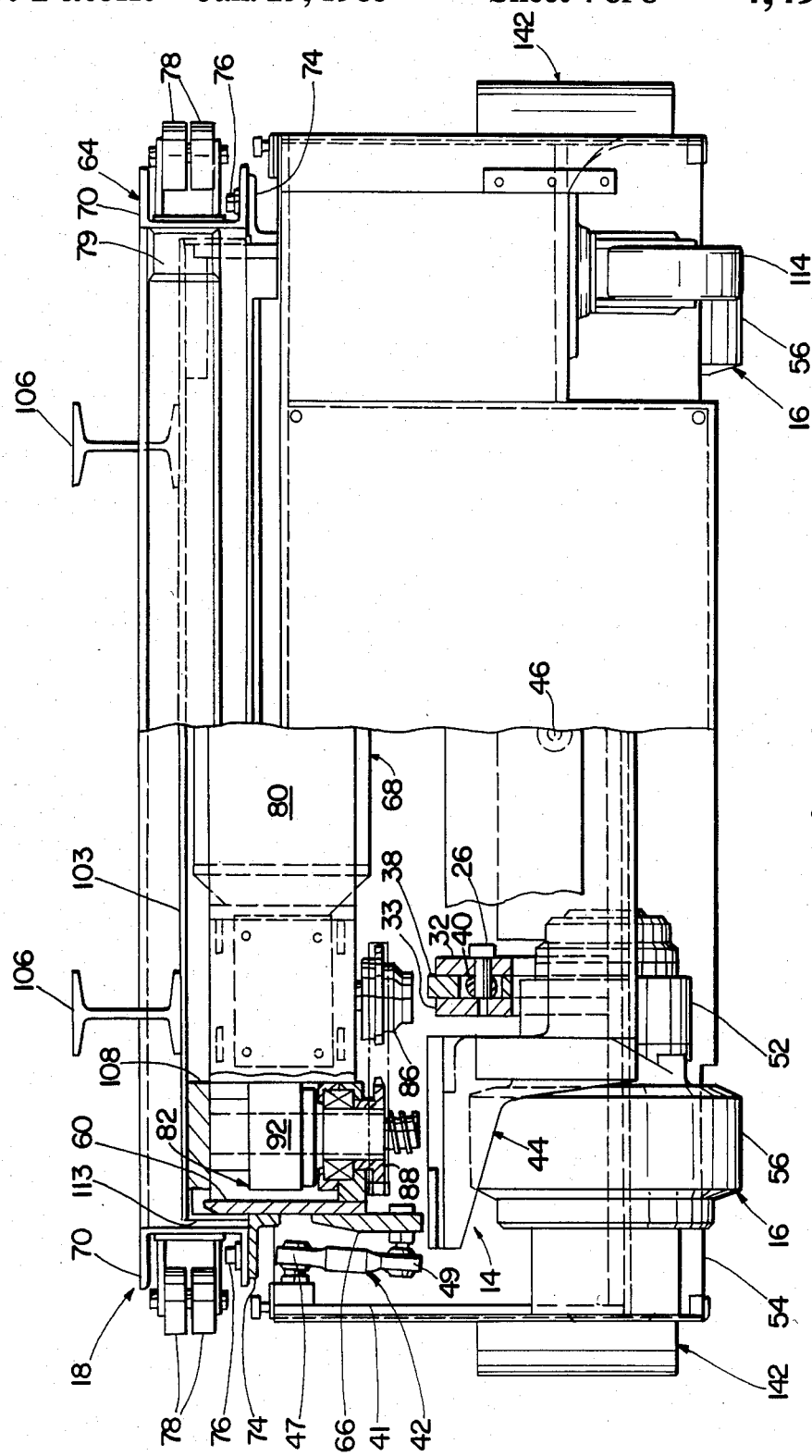
FIG. 4 is a section view taken at line 4—4 of FIG. 2.

The second frame unit 24 is similar to the first, including a second transverse plate member 29, a second top plate member 31 and a second transverse stringer 45 welded to the plate 29. Single pivot plate members 38 extend toward the transverse centerline 27 from the transverse plate 29, and are received between the pivot plates 32 and 33 and are pivotally attached thereto by means of pins 26. Referring to FIG. 4, each of the pivot pins 26 comprises a shouldered pin received through a clearance hole in plate 32 and threaded into plate 33, and is received in a spherical bearing 40 mounted in the plate 38.

The articulation of the vehicle about axis 27 makes it possible to negotiate grades of up to 10%. Such gradeability is not possible with prior art vehicles having central drive wheels because the drive wheels tend to be lifted off the ground when the vehicle starts up the grade.

Referring to FIGS. 3 and 5, vertical side plates 41 are welded to the end of transverse plates 28 and 29 and the transverse stringers 43 and 45, and each extends inwardly toward the transverse centerline 27. As will be described in further detail below, the side plates are adapted to receive one end of link members 42 which support the load platform 18.

Referring particularly to FIGS. 4 and 5, the power unit 14 comprises a frame assembly 44 which is pivotally mounted on the first frame unit 22 for rotation about an axis parallel to the longitudinal centerline 34 of the vehicle by means of pivot pins 46. The frame assembly 44 comprises a pair of transverse frame plates 48, each of which is received between a respective pair of plates 36 and 37 of the first frame unit 22, and a pair of mounting pads 50 which are welded to the tops of plates 48 adjacent the ends thereof and to which the motor wheel units 16 are mounted. The motor wheel units 16 each comprises a motor 52, a gearbox 54, and a drive wheel 56, with the motor being mounted to the pad 50 by a bracket structure (not shown) which attaches to the pad 50 at mounting holes 58. The motor wheel units are operable independently to provide steering of the vehicle and are of a well-known type available commercially; therefore, they will not be described in further detail herein.

Figure 6:
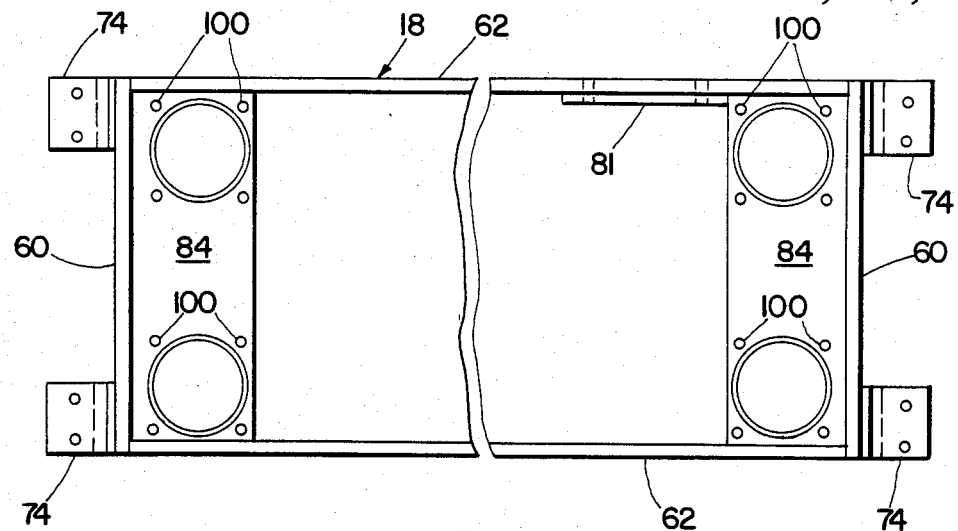
FIG. 6 is a plan view of the load platform of the vehicle.
Figure 7:
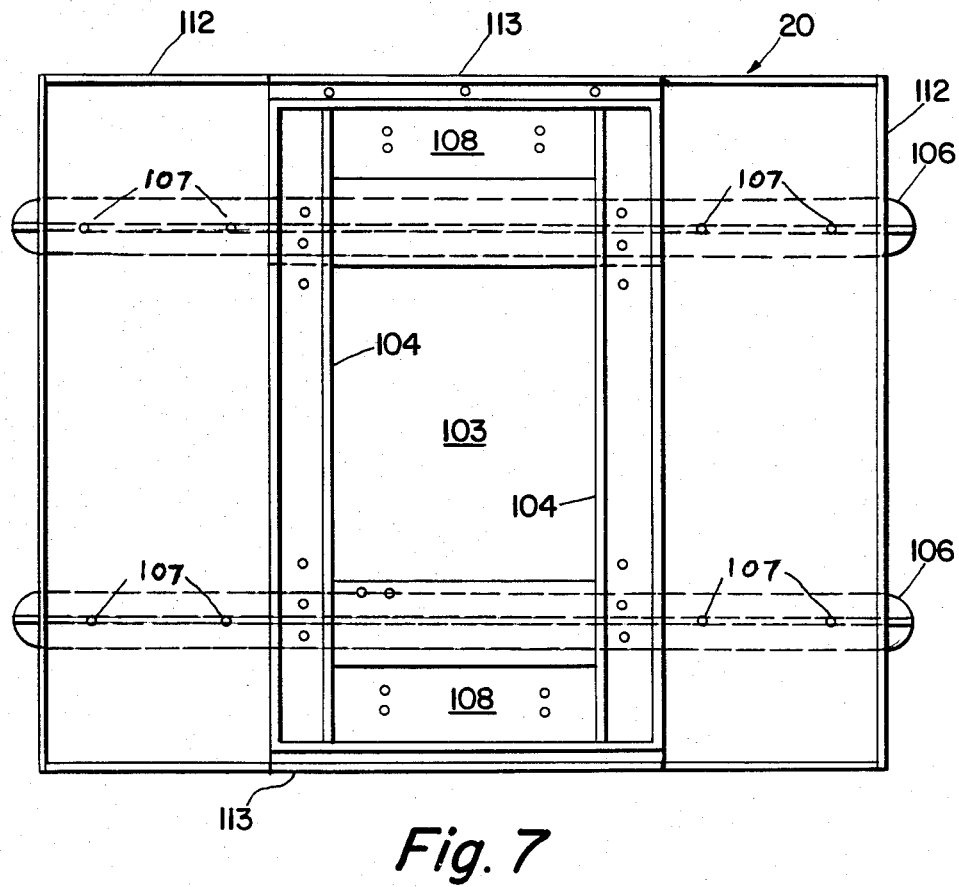
FIG. 7 is a bottom view of the load carriage of the vehicle.

Referring to FIGS. 3, 4, and 6, the load platform 18 is a box-like assembly which is suspended from the vertical side plates 41 of the base frame 12 by means of link members 42. The assembly includes side walls 60, end walls 62, a load squaring frame assembly 64 (not shown in FIG. 6) supported by the side walls, four support pads 66 attached to the side walls for attachment of the link members 42, and a load-lift drive assembly 68 mounted thereon and operable to support the load carriage 20 and to move the load carriage up and down relative to the load platform.

Figure 2:
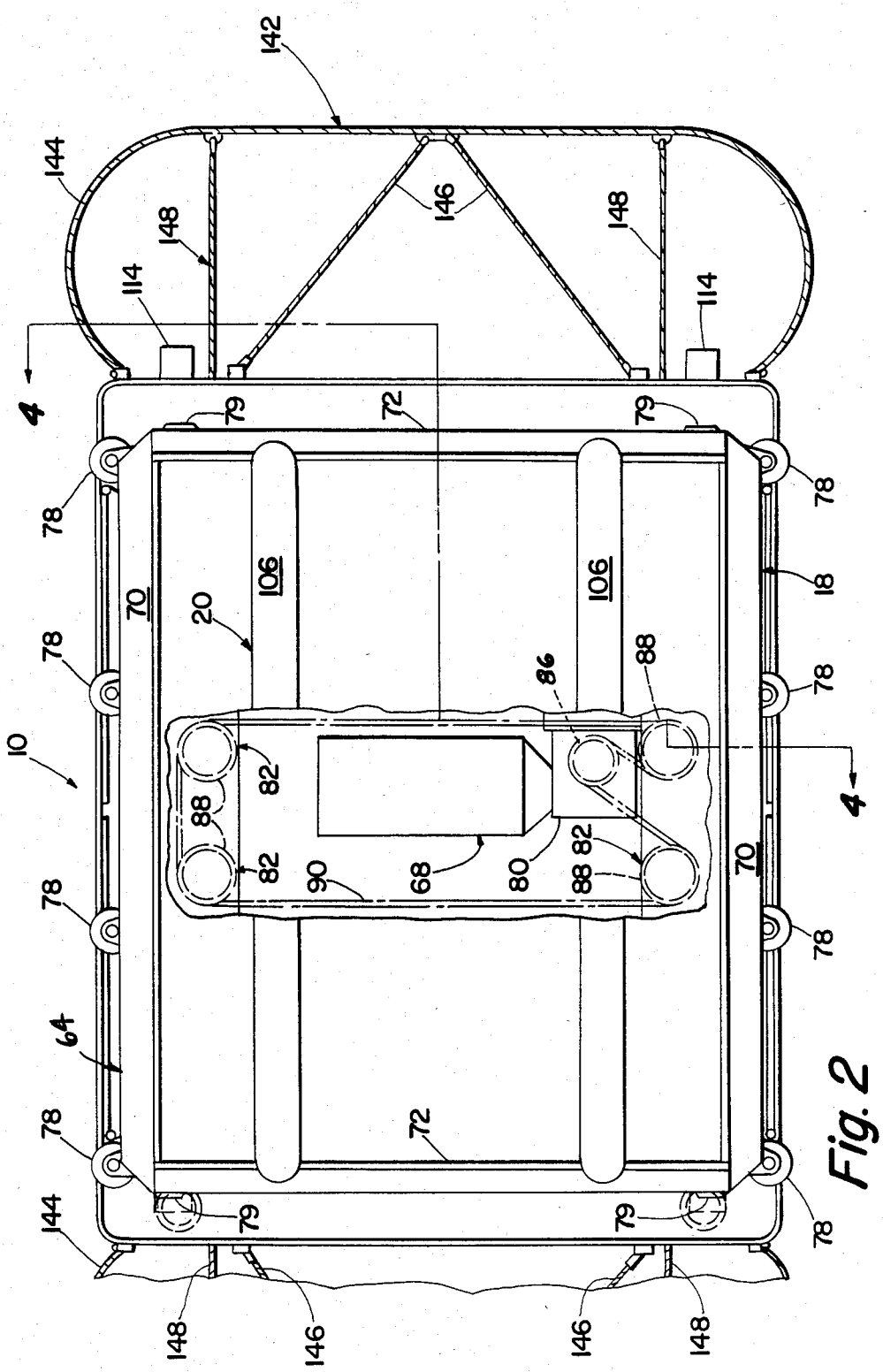
FIG. 2 is a plan view of the vehicle with parts cut away.

Referring to FIGS. 2 and 3, the load squaring frame 64 comprises a pair of side channel members 70, connected by a pair of end channel members 72, and is supported on the load platform 18 by means of a plurality of angle brackets 74 which are welded to the side walls 60 and to which the side channels 70 are attached by means of bolts 76.

The load squaring frame functions to insure that a load carried by the vehicle 10 will be received squarely within a load station even if the vehicle is slightly displaced from the nominal centerline of the guidepath. As will be discussed in further detail below, the load platform 18 is free to move fore and aft and side to side by virtue of the manner in which it is suspended from the base frame assembly. To provide squaring within the load station, a plurality of rollers 78 are mounted on the side channels 70 and extend outward therefrom beyond the sides of the vehicle frame where they can contact guide rails within the load station to center the load therein. To provide cushioning when the vehicle reaches the end of a load station, resilient pads 79 are attached to the end channel members and extend outward therefrom.

The load lift drive assembly 68 comprises a motor and a gear unit 80 mounted on a pad 81 welded to one end 62 of the load platform 18, and a plurality of ball screw lift units 82 mounted on transverse plates 84 welded in place between the end walls 62 and abutting the side walls 60 (FIG. 6). Referring to FIGS. 2 and 4, the motor and gear unit includes an output sprocket 86 and each of the ball screw units includes an input sprocket 88, the sprockets being interconnected by a drive chain 90 which is entrained about the sprockets as illustrated in FIG. 2.

Referring to FIG. 8, each of the ball screw lift units 82 comprises a ball nut assembly 92 to which the input sprocket is keyed, and a ball screw 94 which is received within the ball nut, and which moves up and down when the ball nut is rotated. The ball nut and screw is a commercially available unit and will not be described herein in further detail. The ball nut is received within a double row ball bearing 96 received within the transverse plate 84. The unit is retained by means of a bearing cap 98 which is fastened to the plate 84 by four screws received in holes 100 (FIG. 6).

All four of the screw lift units are identical, each of the upper ends of the ball screws being attached to the load carriage 20 to provide about four inches of vertical travel relative to the load platform, as illustrated by the broken line position of load carriage 20 in FIG. 3.

The load carriage 20 comprises a flat plate 103, a pair of angle members 104 welded to the plate extending transversely of the vehicle, and a pair of longitudinally extending load support beams 106 which are attached to the plate members. The angle members are connected by horizontal plates 108 welded or otherwise attached thereto and to the plate. As shown in FIG. 8, the ball screws 94 bear against the lower surface of the plates 108 and are each attached thereto by means of two screws 110 which prevent the ball screws from turning when the ball nut is rotated.

In order to minimize pinch points when the load carriage moves within the load platform, thin metal skirts 112 in the form of shallow, inverted pans, are attached to the support beams 106 at both ends of the vehicle by means of screws 107. Filler plates 113 attached to the plate 103 span the space between the skirts 112 to, in effect, provide a continuous skirt which fits closely within the load squaring frame 64.

As shown in FIGS. 3 and 4, each of the links 42 comprises an upper link 47 pivotally attached to the upper end of side plate 41 of the base frame and a lower link 49 pivotally attached to support pad 66 of the load platform, permitting both fore and aft and side to side pivotal movement of the load platform and load carriage relative to the base frame. In accordance with the invention the upper ends of the link members are inclined inwardly from the lower ends toward both the longitudinal and transverse centerlines of the vehicle. Movement of the load platform relative to the frame, for example as the result of a sudden stop of the vehicle, causes the lower end of the links to move through arcs in one or both of the longitudinal and transverse directions. By inclining the link members, the vertical distance through which the load platform necessarily moves as a result of such pivoting movement, is increased; therefore, the work which is done on the load in moving it through such a vertical distance is increased, which has a damping effect on the relative movement between the load platform and the frame. Accordingly, a load supported on the load platform is cushioned against shock loads without the need for additional dampers or shock absorbers acting between the frame and the load platform.

Referring to FIG. 3, the vehicle 10 is supported by the motor wheel units 16 and by four caster wheel units 114 mounted adjacent the outboard corners of the vehicle, and which are mounted on battery carrier units 116 attached to the ends of the base frame 12.

Figure 9:
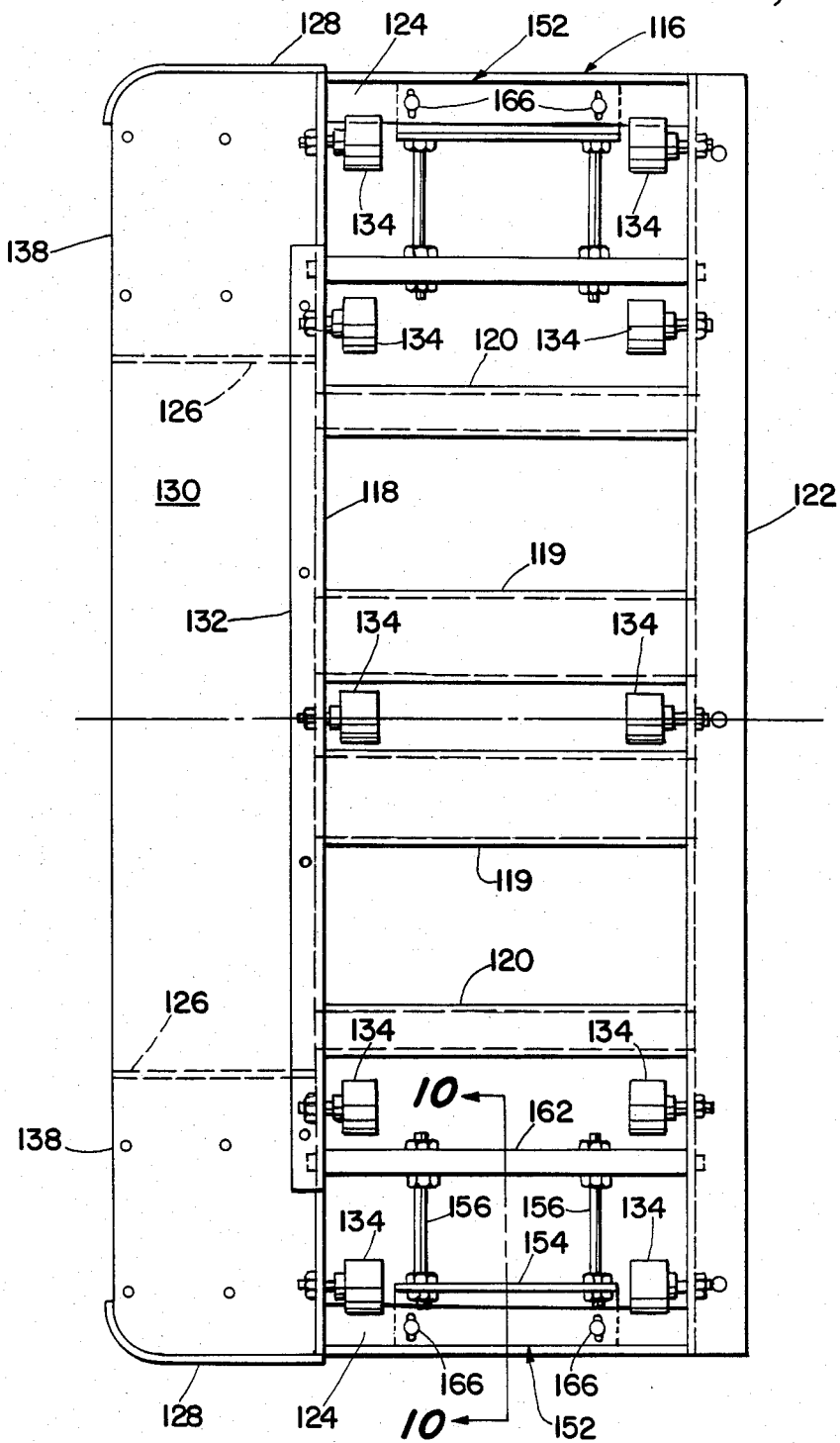
FIG. 9 is a plan view of a battery carrier of the vehicle.

The battery carriers are substantially identical, and only one of them will be described in detail herein. Referring to FIGS. 3 and 9 the carrier comprises a box structure which includes a first transverse plate 118, a plurality of longitudinally extending tubes 119 and 120 having one end welded to the plate 118 adjacent the bottom thereof, a transverse angle member 122 welded to the opposite ends of the tubes 119 and 120, longitudinally extending angle members 124 welded in place between the plate 118 and the angle member 122, upright wall members 126 welded to plate 118 and extending longitudinally outward therefrom, side plates 128 welded to the ends of transverse plate 118, each having an outer end which curves around the end of the vehicle, a top plate 130 fastened to the tops of the transverse plate 118 and the wall members 126 and fitting inside the side plates 128, and a transverse mounting bar 132 welded to the top of transverse plate 118 and to the top plate 130.

The battery carrier 116 is mounted to the vehicle by bolting the mounting bar 132 to the horizontal top plate 30 of the base frame 12 and by bolting the transverse angle member 122 to the stringers 43 and 45 of the base frame 12.

Referring particularly to FIG. 9, a plurality of rollers 134 are attached to the transverse angle member 122 and to the transverse plate 118, and, as shown in FIG. 3, a standard battery case 136 of the type commonly used for lift trucks is received on the rollers between plate 118 of the battery carrier and transverse plate 28 of the base frame 12.

As illustrated in FIGS. 9 and 10, each battery carrier 116 includes a latch assembly 152 on either side which retains the battery case 136, and which is movable to an unlatched position for removal and replacement of a battery. The latch assembly comprises an angle member 154 having a horizontal leg which is received beneath the angle member 124, a pair of threaded rods 156 attached at one end to the vertical leg 158 of the angle member by means of nuts 160 on either side thereof, and extending inwardly toward the centerline of the vehicle, and a bar 162 pivotally mounted to the angle member 122 and to the wall 118, and to which the opposite ends of the rods are attached by means of nuts 164. The angle member 154 is retained relative to the angle 124 by means of a pair of shoulder bolts 166 extending through clearance slots in the angle 124 and threaded into the angle member 154. The bolts 166 have enlarged heads, and compression springs 168 are received between the heads of the bolts and the angle member 124.

FIG. 10 schematically illustrates a battery cart 170 which is adapted for use with the present invention. In accordance with the invention a tapered nosepiece 172 is formed on the forward end of the battery cart in a position wherein it fits between the angle member 124 and a downturned lip 174 formed on the horizontal leg of the angle member 154.

When a battery is in place on the rollers 134, the vertical leg 158 of the angle member 154 extends above the bottom edge of the battery case 136 to retain the battery within the vehicle. When a battery is to be removed and the cart 170 is moved into engagement with the side of the vehicle, the nosepiece 172 moves the angle member 154 downward, pivoting the latch assembly about the axis of the bar 162, and thus putting the vertical leg 158 in a position out of the way of the battery case. The battery can then be slid out of the vehicle on rollers 134 and onto rollers 176 on the battery cart.

The caster wheel units 114 are mounted on horizontal plates 138 which are welded to the transverse plate 118 and the wall members 126. The caster units themselves are conventional, commercially available assemblies and will not be described herein in further detail.

Referring to FIG. 3, the side of the vehicle 10 is partially enclosed by doors 140, as shown on the right end of the vehicle illustrated in FIG. 3, which are removable to provide access to the battery carrier.

The vehicle 10 is provided with safety bumper assemblies 142 at either end which insures that the vehicle stops immediately upon contacting an object in its path. The bumper assemblies are conventional in their overall design, and include a flexible bumper member 144 attached at both ends to the side plates 128, a first pair of cables 146 extending between the bumper 144 and the caster wheel mounting plate 138, and a second pair of cables 148 extending between the bumper 144 and the wall members 126. At the vehicle end the cables 148 are attached to the walls 126, and the cables 146 are connected to switches mounted on plate 138 (not shown), which are spring-loaded in a first actuated position (either open or closed) by tension in the cables. Any contact made by either bumper with an object will cause at least one of the cables 146 to go slack, causing the associated switch to move to its second actuated position (open or closed) to control an appropriate electrical circuit which stops operation of the vehicle until the path is cleared. The switches are connected so that the actuation of any one of the switches will cause the vehicle to stop.

In operation the vehicle follows a guidewire buried in a floor according to a predetermined guidepath, with steering of the vehicle being accomplished by differential operation of the motor wheel units 16. When a load is to be picked up by the vehicle the vehicle is directed into a load station beneath a load supported on rails within the station. Once inside the station, the load carriage 20 is raised to the broken line position of FIG. 3 to pick up the load on the load support beams 106, whereupon the vehicle moves out of the load station and along its guide path to a second load station where the load can be removed by reversing the above procedure.

I claim:

1. A vehicle comprising a first frame, a second frame attached to said first frame for pivotal movement about a first horizontal axis perpendicular to the longitudinal axis of the vehicle, a third frame attached to said first frame for pivotal movement about a second horizontal axis parallel to the longitudinal axis of the vehicle, first and second motor wheel units mounted on said third frame, each of said motor wheel units including a drive wheel having its rotational axis substantially vertically aligned with said first horizontal axis, and a load platform suspended from said first and second frames for swinging movement in a plurality of planes.

2. Apparatus as claimed in claim 1 including a load carriage mounted on said load platform for vertical movement relative thereto.

3. Apparatus as claimed in claims 1 or 2 in which said load platform is suspended from said frames by means of a plurality of link members extending between said frames and said load platform.

4. Apparatus as claimed in claim 3, in which each of said link members is attached to said frames and to said load platform by means of ball end members.

5. Apparatus as claimed in claim 4, including a first pair of link members attached to said first frame and a second pair of link members attached to said second frame, said link members being angled outwardly from said frames to said load platform.

6. Apparatus as claimed in claim 2, including a plurality of extensible lift members acting between said load platform and said load carriage, and drive means acting on said lift members to selectively move said load carriage vertically up and down relative to said load platform.

7. Apparatus as claimed in claim 6 in which each of said lift members comprises a ball screw assembly.

8. Apparatus as claimed in claim 7, in which said load platform comprises a substantially rectangular frame, and said apparatus includes a lift assembly adjacent each of the four corners of said frame, a motor drive unit mounted on said frame, a sprocket wheel attached to each of said lift assemblies, a sprocket wheel mounted on an output shaft of said motor drive unit, and a chain interconnecting said sprocket wheels.

9. Apparatus as claimed in claim 8 in which each of said lift assemblies comprises a ball nut supported for rotation on said load platform, and a ball screw received within said ball nut and having its upper end bearing against said load carriage, said sprocket wheel being attached to said ball nut.

10. Apparatus as claimed in claim 1 including a battery carrier mounted on said first frame to receive a battery case, and a latch assembly mounted on said battery carrier, said latch assembly being moveable between a first position engageable by an edge of said battery case and a second position out of the way of said battery case.

11. Apparatus as claimed in claim 10, in which said battery carrier includes a plurality of rollers mounted thereon in position to receive said battery case; and said latch assembly comprises an angle member resiliently mounted on said battery carrier, and means mounting said angle member for rotation between a first position wherein a vertical leg of said angle member extends above the plane defined by the top surfaces of said rollers and a second position wherein said vertical leg is disposed below said plane.

12. Apparatus as claimed in claim 11, including in combination therewith a battery cart adapted for the transfer of a battery case between said cart and said vehicle, said battery cart including a forwardly extending nose member engageable with a horizontal leg of said angle member to move said angle member from said first position to said second position.

13. Apparatus as claimed in claim 12 including spring means acting between said battery carrier and said angle member to bias said angle member toward said first position.

* * * * *